(12) United States Patent
Teguri et al.

(10) Patent No.: US 7,324,295 B2
(45) Date of Patent: Jan. 29, 2008

(54) METHOD OF DETECTING POSITION OF HEAD IN RECORDING MEDIUM DRIVE

(75) Inventors: Hironori Teguri, Kawasaki (JP); Tsugito Maruyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 11/167,846

(22) Filed: Jun. 27, 2005

(65) Prior Publication Data

US 2006/0198291 A1    Sep. 7, 2006

(30) Foreign Application Priority Data

Mar. 1, 2005    (JP) .............................. 2005/055623

(51) Int. Cl.
*G11B 5/56* (2006.01)

(52) U.S. Cl. ........................................ 360/51

(58) Field of Classification Search ............... 360/51; 369/51, 277
See application file for complete search history.

(56) References Cited

U.S. PATENT DOCUMENTS

| | | | |
|---|---|---|---|
| 4,556,920 A * | 12/1985 | Maeda et al. ............ | 360/77.06 |
| 2002/0136927 A1 | 9/2002 | Hieda et al. | |
| 2005/0094549 A1 | 5/2005 | Hieda et al. | |

FOREIGN PATENT DOCUMENTS

| | | |
|---|---|---|
| JP | 2002-279616 | 9/2002 |
| JP | 2003-151103 | 5/2003 |

OTHER PUBLICATIONS

Lambert et al.; Recording Characteristics of Submicron Discrete Magnetic Tracks; IEEE Trans. on Magn., vol. MAG-23, No. 5; Sep. 1987; pp. 3690-3692.
Soeno et al.; Feasibility of Discrete Track Perpendicular Media for High Track Density Recording; IEEE Trans. on Magn., vol. 39, No. 4; Jul. 2003; pp. 1967-1971.
Chou et al.; Single-domain magnetic pillar array of 35 nm diameter and 65 Gbits/in.$^2$ density for ultrahigh density quantum magnetic storage; J. Appl. Phys. 76, Nov. 15, 1994; pp. 6673-6675.
Naito; 2.5-Inch-Disk Patterned Media Prepared by Means of Self-Assembling Nano-Dot Structures; Journal of the Magnetics Society of Japan, vol. 27, No. 3; 2003.

* cited by examiner

*Primary Examiner*—Hoa Nguyen
*Assistant Examiner*—Henok Heyi
(74) *Attorney, Agent, or Firm*—Greer, Burns & Crain, Ltd.

(57) ABSTRACT

The difference is detected between the outputs from first and second heads in a recording medium drive. The first head is positioned relative to the boundary between a first recording track and a separation track isolating the first recording track and a second recording track from each other. The second head is positioned relative to the boundary between the separation track and the second recording track. A position information specifying the positions of the first and second heads are generated based on the difference. The first and second heads follow the different boundaries, so that the outputs of the first and second heads reliably vary. The difference between the outputs thus reliably changes. An accurate position information can be generated based on the difference. The position information may be utilized in tracking servo control, for example. This enables establishment of the tracking servo control with a higher accuracy.

5 Claims, 10 Drawing Sheets

METHOD OF DETECTING POSITION OF HEAD IN RECORDING MEDIUM DRIVE

BACKGROUND OF THE INVENTION

1. Field of the Invention

The present invention relates to a recording medium drive designed to position a head on a recording track defined on a recording medium.

2. Description of the Prior Art

A so-called discrete track medium is well known as disclosed in Japanese Patent Application Publication No. 2002-279616. Separation tracks are defined on the discrete track medium between respective adjacent ones of the recording tracks so as to isolate the adjacent recording tracks from each other. For example, the aforementioned Publication discloses the separation tracks made of a magnetic material. As shown in FIGS. 19 and 20 of the Publication, a tracking head is utilized to enable so-called tracking servo control. The tracking head serves to read out tracking signals out of the separation tracks. A read/write head is allowed to trace a predetermined target recording track based on the tracking signals.

The tracking servo control often suffers from the tracking head having the core width smaller or larger than the width of the recording tracks. In this case, the maximum value is sometimes maintained in the output of the tracking signal even if the tracking head moves in the radial direction of the medium. In other words, a shift of the tracking head in the radial direction cannot be detected even if the read/write head deviates from the recording track in the radial direction. The tracking servo control suffers from a deteriorated accuracy.

SUMMARY OF THE INVENTION

It is accordingly an object of the present invention to provide a recording medium drive enabling tracking servo control of a higher accuracy with a simple structure. It is an object of the present invention to provide a method of positioning a head contributing to realization of tracking servo control with a higher accuracy with a simple structure.

According to a first aspect of the present invention, there is provided a method of detecting position of a head in a recording medium drive, comprising: detecting a difference between the outputs from first and second heads, said first head positioned on the boundary between a first recording track and a separation track isolating the first recording track and a second recording track from each other, said second head positioned on the boundary between the separation track and the second recording track; and generating a position information specifying the positions of the first and second heads based on the difference.

Since the first head is positioned relative to the boundary between the separation track and the first recording track, the output level of the first head based on the first recording track changes in response to the relative position between the first head and the boundary. Likewise, the second head is positioned relative to the boundary between the separation track and the second recording track, so that the output level of the second head based on the second recording track changes in response to the relative position between the second head and the boundary. The first and second heads follow the different boundaries, so that the outputs of the first and second heads reliably vary. The difference between the outputs thus reliably changes. An accurate position information can be generated based on the difference. The position information may be utilized in tracking servo control, for example. This enables establishment of the tracking servo control with a higher accuracy.

Moreover, the difference between the outputs of the first and second head is utilized to realize the tracking servo control. The outputs of the first and second heads can be utilized to detect the difference. Establishment of so-called servo sectors can thus be omitted in the recording medium. The recording area for data is allowed to extend over a larger area in the recording medium as compared with a conventional recording medium. Area can be enlarged for recordation of bit data. Additionally, the structure of the recording medium can be simplified as compared with a conventional recording medium. A process of forming servo sectors can also be omitted in the production of the recording medium, so that the production time can greatly be shortened.

The core width X of the first and second heads may be defined as $$\frac{W}{2} + n \times (W+L) \leq X \leq \frac{W}{2} + L + n \times (W+L)$$

where $n \geq 0$ ($n$ = integer)

where L denotes the width of the first and second recording tracks, and W denotes the width of the separation track.

According to a second aspect of the present invention, there is provided a recording medium drive comprising: a recording medium defining a separation track isolating adjacent first and second recording tracks; a first head opposed to the boundary between the separation track and the first recording track; a second head opposed to the boundary between the separation track and the second recording track; a drive mechanism supporting the first and second heads, said drive mechanism designed to drive the first and second heads in the lateral direction of the first and second recording tracks; and a controller circuit designed to control the operation of the drive mechanism according to the difference between the outputs supplied from the first and second heads based on the first and second recording tracks.

The recording medium drive of the type allows variation in the output levels of the first and second heads in the aforementioned manner. Since the first and second heads are opposed to the different boundaries, any one of the outputs reliably changes even if the other output fails to change. The output difference reliably changes. The output difference can be utilized to reliably detect the positions of the first and second heads. The controller circuit is thus allowed to control the operation of the drive mechanism. This enables establishment of the tracking servo control with a higher accuracy.

Moreover, the difference between the outputs of the first and second head is utilized to realize the tracking servo control. Establishment of so-called servo sectors can thus be omitted in the recording medium. The recording area for data is allowed to extend over a larger area in the recording medium as compared with a conventional recording medium. Area can be enlarged for recordation of bit data. Additionally, the structure of the recording medium can be simplified as compared with a conventional recording medium. A process of forming servo sectors can also be omitted in the production of the recording medium, so that the production time can greatly be shortened.

According to a third aspect of the present invention, there is provided a method of generating a clock signal for a recording medium drive, comprising: sequentially moving first and second heads along a row of recording cells equally spaced one another in a separation track isolating adjacent recording tracks; detecting the difference of outputs from the first and second heads based on the recording cells; and generating the clock signal based on the difference.

The method enables detection of the difference based on the outputs supplied from the first and second heads. The first and second heads are allowed to sequentially pass through the recording cells in the direction of the row. This movement causes variation in the outputs of the first and second heads as time elapses. Since the first and second heads sequentially move, a time lag can be defined between the outputs of the first and second heads. The output difference thus varies. The variation in the output difference may be utilized to generate a clock signal. The clock signal may be utilized to control the timings of read or write operation in a recording medium drive. The timings can be controlled with a higher accuracy.

According to a fourth aspect of the present invention, there is provided a recording medium drive comprising: a recording medium defining a row of recording cells equally spaced one another in a separation track isolating adjacent recording tracks; first and second heads opposed to the recording cells; a read/write head designed to effect read/write operations for the recording track; and a clock signal generating circuit designed to generate a clock signal based on the difference between outputs from the first and second heads, said clock signal specifying the timing of the read/write operations of the read/write head.

The recording medium drive enables detection of the difference based on the outputs supplied from the first and second heads. The first and second heads are allowed to sequentially pass through the recording cells in the direction of the row. This movement causes variation in the outputs of the first and second heads as time elapses. Since the first and second heads sequentially move, a time lag can be defined between the outputs of the first and second heads. The output difference thus varies. The variation in the output difference may be utilized to generate a clock signal. The clock signal is utilized to control the timings of read or write operation in the recording medium drive. The timings can be controlled with a higher accuracy.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
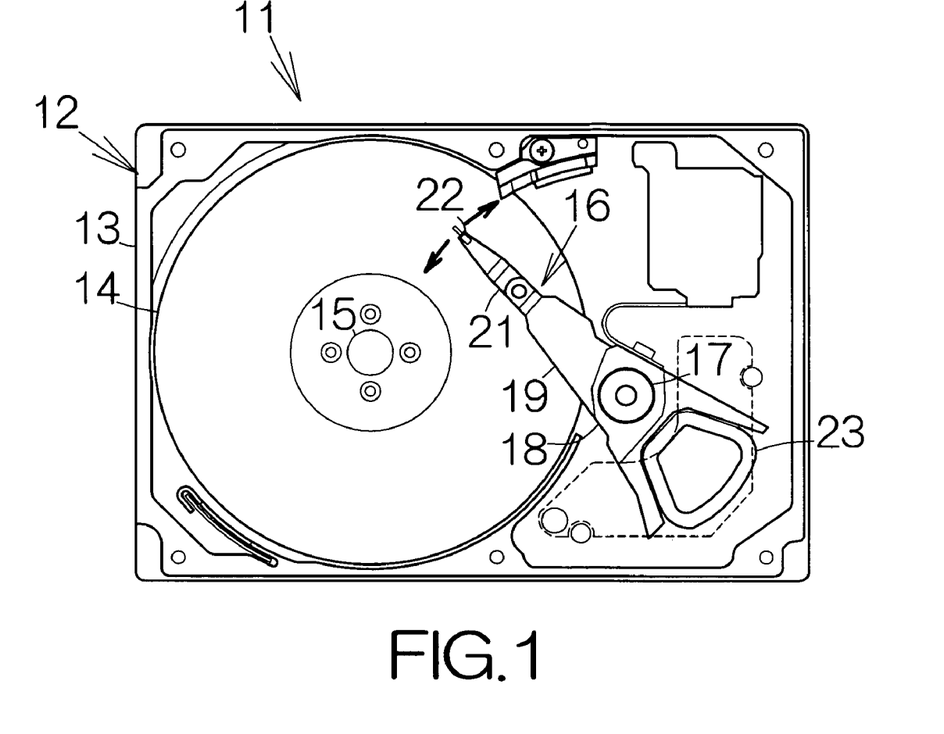
FIG. 1 is a plan view schematically illustrating the structure of a hard disk drive, HDD, as an example of a recording medium drive according to the present invention.

FIG. 1 schematically illustrates the inner structure of a hard disk drive, HDD, 11 as an example of a recording disk drive or storage device according to an embodiment of the present invention. The hard disk drive 11 includes a box-shaped enclosure 12. The enclosure 12 has an open box-shaped enclosure body 13 defining an inner space of a flat parallelepiped, for example. The enclosure body 13 may be made of a metallic material such as aluminum, for example. Molding process may be employed to form the enclosure body 13. A cover, not shown, is coupled to the enclosure body 13 so as to define the closed inner space between the enclosure body 13 and the cover itself. Pressing process may be employed to form the cover out of a single plate such as an aluminum plate, for example.

A printed circuit board, not shown, is attached to the outside of the enclosure body 13. LSI chips such as a microprocessor unit (MPU), a hard disk controller (HDC), and the like, and a connector are mounted on the printed circuit board. The MPU and the hard disk controller serve to control the operation of the hard disk drive 11. The connector is designed to receive cables for control signals and electric power extending from a main board of a host computer, for example. Electric power is supplied to the MPU and the hard disk controller for operations through the cables for electric power.

At least one magnetic recording disk 14 as an example of a recording medium is incorporated in the inner space of the enclosure 12. The magnetic recording disk or disks 14 is mounted on the driving shaft of the spindle motor 15. The spindle motor 15 is allowed to drive the magnetic recording disk or disks 14 for rotation at a higher revolution speed such as 5,400 rpm, 7,200 rpm, 10,000 rpm, or the like, for example.

A head actuator 16 serving as a driving mechanism is also incorporated in the inner space of the enclosure 12. The head actuator 16 comprises an actuator block 18. The actuator block 18 is coupled to a vertical support shaft 17 for relative rotation. Rigid actuator arms 19 are defined in the actuator block 18 so as to extend in the horizontal direction from the vertical support shaft 17. The actuator arms 19 are related to the front and back surfaces of the magnetic recording disk 14. The actuator block 18 may be made of aluminum. Molding process may be employed to form the actuator block 18.

Head suspensions 21 are fixed to the corresponding tip ends of the actuator arms 19 so as to further extend in the forward direction from the actuator arms 19. As conventionally known, a flying head slider 22 is supported at the front end of the individual head suspension 21. The flying head slider 22 is opposed to the surface of the magnetic recording disk 14.

The head suspension 21 serves to urge the flying head slider 22 toward the surface of the magnetic recording disk 14. When the magnetic recording disk 14 rotates, the flying head slider 22 is allowed to receive airflow generated along the rotating magnetic recording disk 14. The airflow serves to generate a positive pressure or lift on the flying head slider 22. The flying head slider 22 is thus allowed to keep flying above the surface of the magnetic recording disk 14 during the rotation of the magnetic recording disk 14 at a higher stability established by the balance between the urging force of the head suspension 21 and the lift. As conventionally known, in the case where two or more of the magnetic recording disk 14 are incorporated in the enclosure 12, a pair of the actuator arm 19 and head suspension 21 is located in a space between the adjacent magnetic recording disks 14.

A power source such as a voice coil motor 23 is coupled to the actuator block 18. The voice coil motor 23 serves to drive the actuator block 18 for rotation around the support shaft 17. The rotation of the actuator block 18 induces the swinging movement of the actuator arms 19 and the head suspensions 21. When the actuator arm 19 is driven to swing about the support shaft 17 during the flight of the flying head slider 22, the flying head slider 22 is allowed to move along the radial direction of the magnetic recording disk 14.

Figure 2:
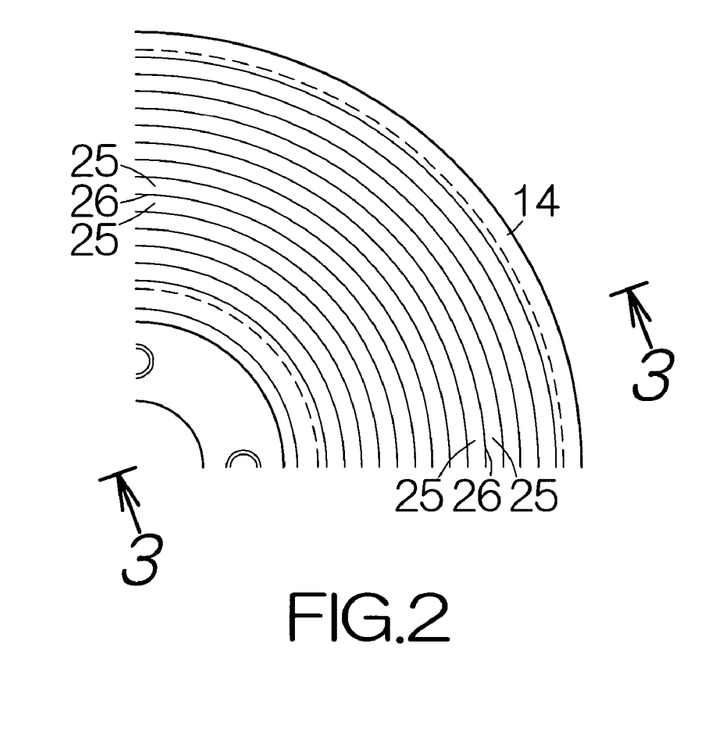
FIG. 2 is a partial plan view of a magnetic recording disk incorporated in the hard disk drive according to a first embodiment of the present invention.

FIG. 2 schematically illustrates the structure of the magnetic recording disk 14 according to a first embodiment of the present invention. As shown in FIG. 2, stripes of recording tracks 25, 25, . . . , are defined on the front and back surfaces of the magnetic recording disk 14. The recording tracks 25 trace concentric circles to extend in the circumferential direction of the magnetic recording disk 14. The recording tracks 25 are made of a magnetic material. Magnetic information is recorded in the recording tracks 25. A non-recording or separation track 26 is interposed between the individual adjacent ones of the recording tracks 25, 25 so as to isolate the adjacent recording tracks 25, 25 from each other. The separation tracks 26 likewise trace concentric circles to extend in the circumferential direction of the magnetic recording disk 14. The separation tracks 26 are made of a non-magnetic material. Here, the width of the recording track 25 may be set in a range from twice the width of the separation track 26 to four times the width of the separation track 26.

Figure 3:
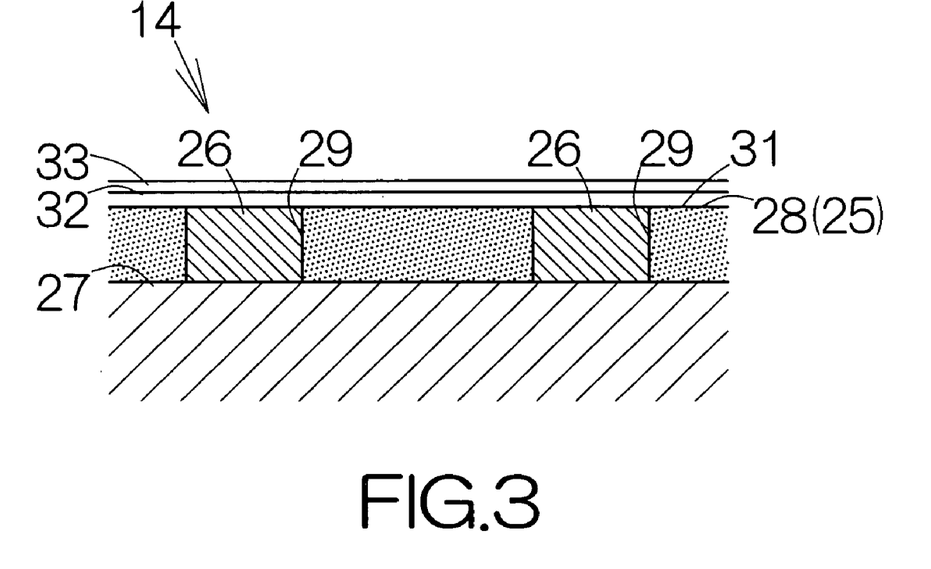
FIG. 3 is an enlarged partial sectional view taken along the line 3-3 in FIG. 2.

As shown in FIG. 3, the magnetic recording disk 14 includes a substrate 27. A glass substrate may be utilized as the substrate 27, for example. A magnetic layer 28 is overlaid on the surface of the substrate 27. The recording tracks 25 are established in the magnetic layer 28. Parallel grooves 29 are formed in the magnetic layer 28. The grooves 29 are filled with a non-magnetic material. The non-magnetic material in the grooves 29 corresponds to the separation tracks 26. A flat surface 31 is defined over the surfaces of the recording tracks 25 and separation tracks 26. The flat surface 31 may be covered with a protection layer 32, such as a diamond-like-carbon (DLC) film, a lubricating film 33, such as a perfluoropolyether (PFPE) film, and the like, for example. The magnetic recording disk 14 of the type is suitable for in-plane magnetic recording. The axis of easy magnetization is set in the magnetic layer 28 in the direction in parallel with the flat surface 31.

Figure 4:
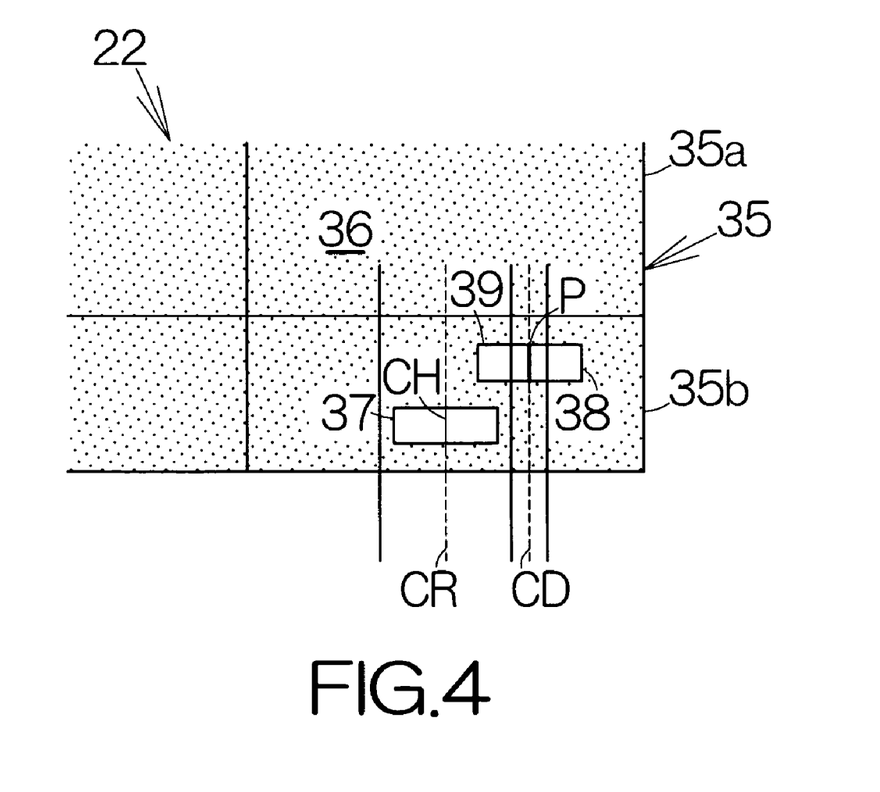
FIG. 4 is an enlarged plan view schematically illustrating a part of the bottom surface of a flying head slider incorporated in the hard disk drive.

As shown in FIG. 4, the flying head slider 22 includes a slider body 35 of a flat parallelepiped, for example. The slider body 35 is opposed to the magnetic recording disk 14 at the medium-opposed surface or bottom surface 36. When the magnetic recording disk 14 rotates, airflow is generated along the bottom surface 36 from the front end of the slider body 35 to the rear end of the slider body 35. The slider body 35 may include a base body 35a made of $Al_2O_3$—TiC, for example, and a head protection film 35b, made of alumina, $Al_2O_3$, overlaid on the rear end of the base body 35a.

An electromagnetic transducer or read/write head element 37 is mounted on the slider body 35. The electromagnetic transducer 37 is embedded within the head protection film 35b of the slider body 35. The electromagnetic transducer 37 may include a read element and a write element. The read element may include a giant magnetoresistive (GMR) element or a tunnel-junction magnetoresistive (TMR) element designed to discriminate magnetic bit data on the magnetic recording disk 14 by utilizing variation in the electric resistance of a spin valve film or a tunnel-junction film, for example. The write element may include a thin film magnetic head designed to write magnetic bit data into the magnetic recording disk 14 by utilizing a magnetic field induced at a thin film coil pattern.

Likewise, first and second read head elements 38, 39 are mounted on the slider body 35. The first and second read head elements 38, 39 are also embedded within the head protection film 35b. The first and second read head elements 38, 39 may be a magnetoresistive (MR) read element such as a GMR or TMR element, for example.

The first and second read head elements 38, 39 are arranged side by side in the lateral direction of the recording track 25. The distance between the centerline CH of the electromagnetic transducer 37 and the boundary P between the first and second read head elements 38, 39 may be set equal to the distance between the centerline CR of the recording track 25 and the centerline CD of the separation track 26. The core width of the first read head element 38 is set equal to that of the second read head element 39. The core width of the first and second read head elements 38, 39 will be described later in detail.

Figure 5:
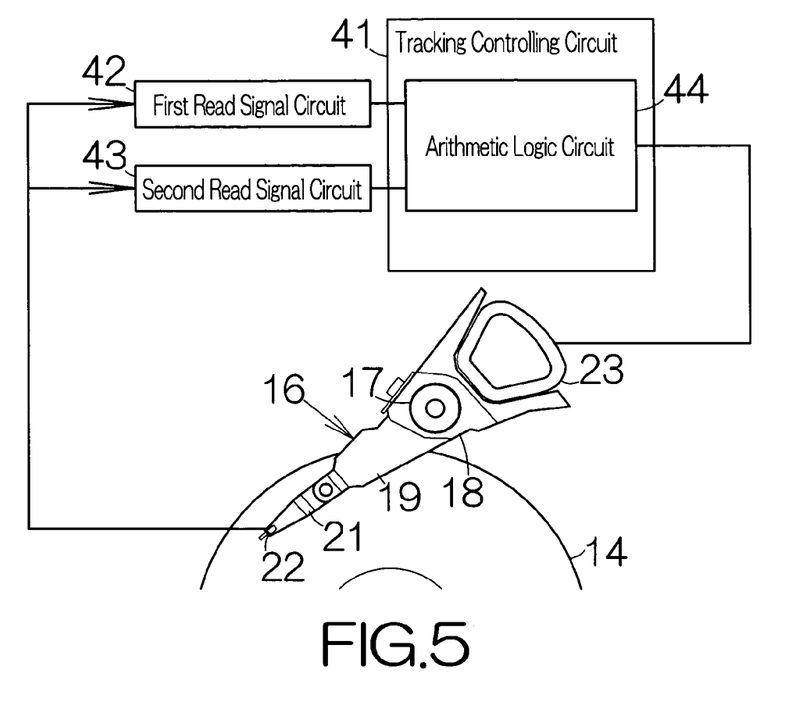
FIG. 5 is a block diagram schematically illustrating the controlling system for tracking servo.

As shown in FIG. 5, the hard disk drive 11 includes a controller circuit or tracking controlling circuit 41. The tracking controlling circuit 41 is designed to realize tracking servo control based on reproduction signals supplied from the first and second read head elements 38, 39. The amount or quantity of the rotation of the head actuator 16 around the support shaft 17 is determined in the tracking servo control based on the deviation between the electromagnetic transducer 37 on the flying head slider 22 and a predetermined orbit. The head actuator 16 serves to move the electromagnetic transducer 37 toward the centerline of the target recording track 25. The tracking servo control enables tracking of the electromagnetic transducer 37 right on the target recording track 25 on the magnetic recording disk 14.

A first read signal circuit 42 is connected to the tracking controlling circuit 41 so as to supply the tracking controlling circuit 41 with the reproduction signals from the first read head element 38. Likewise, a second read signal circuit 43 is connected to the tracking controlling circuit 41 so as to supply the tracking controlling circuit 41 with the reproduction signals from the second read head element 39. The first and second read signal circuits 42, 43 are respectively designed to supply the first and second read head elements 38, 39 with corresponding sensing currents. The variation in the electric resistance at the first and second read elements 38, 39 appears in the voltage level of the sensing current. An arithmetic logic circuit 44 is designed to receive the reproduction signals detected based on the variation in the voltage.

The arithmetic logic circuit 44 detects the difference between the output levels of the reproduction signals from the first read signal circuit 42 and the reproduction signals from the second read signal circuit 43. The arithmetic logic circuit 44 serves to generate positional information based on the detected difference. The positional information specifies the positions of the first and second read head elements 38, 39. The generation of the positional information will be described later in detail. The positional information is utilized to generate control signals. The control signals are supplied to the voice coil motor 23. The head actuator 16 is allowed to rotate around the support shaft 17 based on the magnitude of the control signals supplied to the voice coil motor 23. The tracking servo control is in this manner realized.

Figure 6:
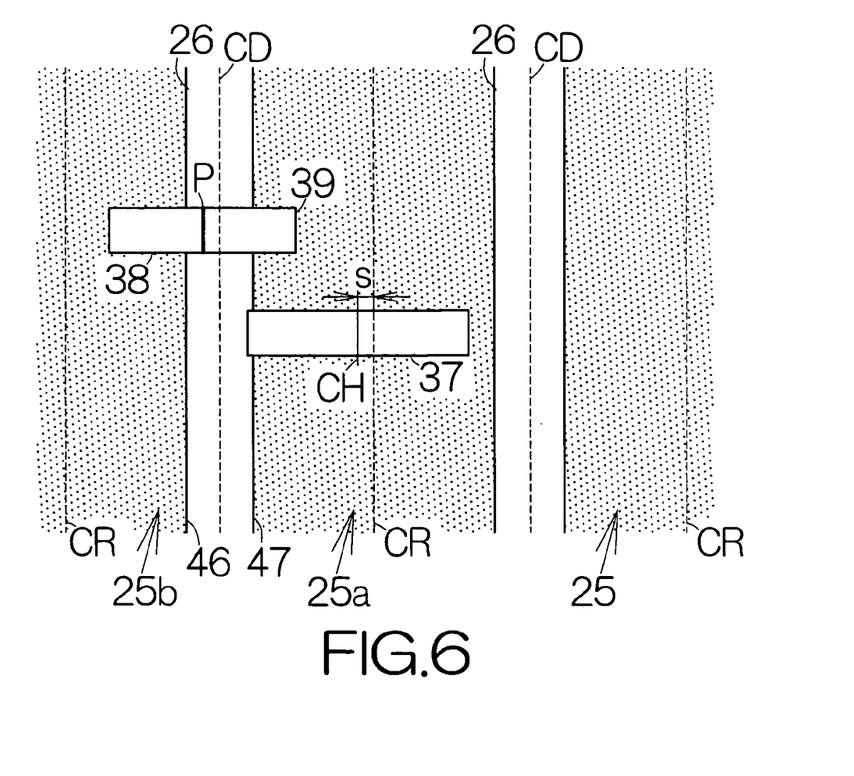
FIG. 6 is a schematic view illustrating the positional relationship between the electromagnetic transducer and first and second read head elements.

Now, assume that the flying head slider 22 is to be positioned in the radial direction during the rotation of the magnetic recording disk 14. Here, as shown in FIG. 6, adjacent first and second recording tracks 25a, 25b are defined on the magnetic recording disk 14, for example. The separation track 26 isolates the first and second recording tracks 25a, 25b. The electromagnetic transducer 37 is positioned above the first recording track 25a. The first read head element 38 is located above the boundary 46 between the separation track 26 and the second recording track 25b. The second read head element 39 is likewise located above the boundary 47 between the separation track 26 and the first recording track 25a.

As is apparent from FIG. 6, the electromagnetic transducer 37 often slightly deviates from the centerline CR of the first recording track 25a in the radial direction due to vibration of the flying head slider 22 or the magnetic recording disk 14 and other factors. If the first read head element 38 moves from a space above the separation track 26 to space above the second recording track 25b, for example, the output of the first read head element 38 increases. If the first read head element 38 moves from the second recording track 25b to the separation track 26, the output of the first read head element 38 decreases. The output of the first read head element 38 in this manner varies in response to the radial movement of the electromagnetic transducer 37. Specifically, the relative position between the first read head element 38 and the boundary 46 induces the variation in the output level of the first read head element 38. The output level of the second read head element 39 likewise varies in response to the movement of the electromagnetic transducer 37. The difference in this manner varies between the output levels of the first and second read head elements 38, 39.

The tracking controlling circuit 41 calculates an offset amount s, corresponding to the deviation of the electromagnetic transducer 37 in the radial direction, based on the difference between the output levels of the first and second read head elements 38, 39. The offset amount s is defined as the deviation between the centerline CR of the recording track 25 and the centerline CH of the electromagnetic transducer 37. The distance between the boundary P and the centerline CH of the electromagnetic transducer 37 is set equal to the distance between the centerline CR of the recording track 25 and the centerline CD of the separation track 26 as mentioned above. Accordingly, the offset amount s should correspond to the deviation between the boundary P and the centerline CD of the separation track 26. Specifically, the offset amount s can be detected based on the position of the boundary P in the radial direction.

Figure 7:
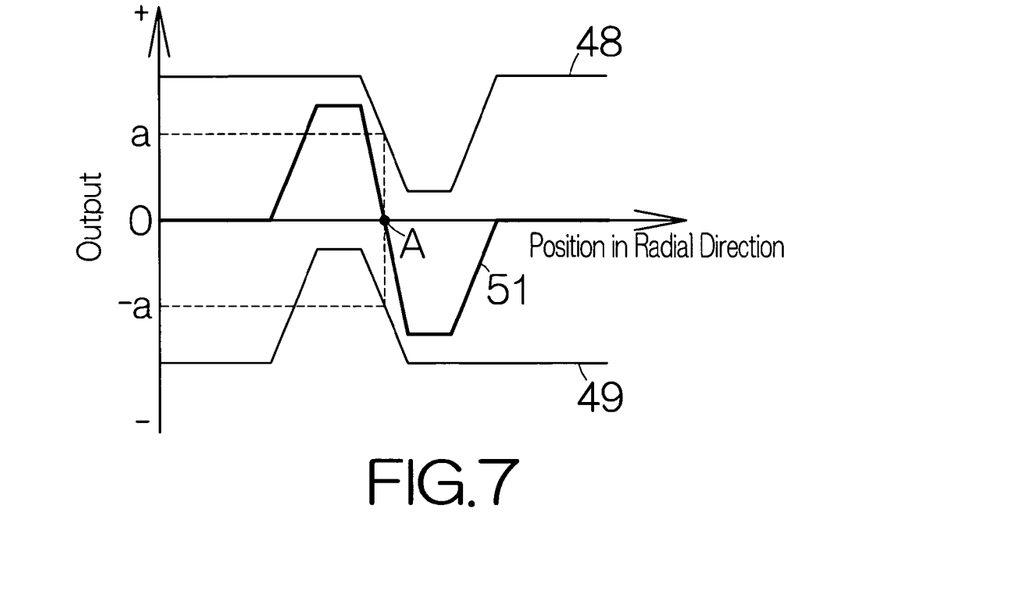
FIG. 7 is a graph illustrating the output profiles of the first and second read head elements.

FIG. 7 illustrates the difference between the output levels of the first and second read head elements 38, 39 detected at the arithmetic logic circuit 44. The arithmetic logic circuit 44 detects the reproduction signal of the first read head element 38 as an output 48. The arithmetic logic circuit 44 likewise detects the reproduction signal of the second read head element 39 as an output 49. The arithmetic logic circuit 44 calculates an output difference 51 between the levels of the outputs 48, 49. The output difference 51 corresponds to the difference between the outputs 48, 49. As is apparent from FIG. 7, the outputs 48, 49 vary in accordance with the position of the boundary P in the radial direction. The output difference 51 accordingly varies based on the position of the boundary P.

When the boundary P is positioned above the centerline CD of the separation track 26 during the rotation of the magnetic recording disk 14, for example, the arithmetic logic circuit 44 detects the outputs of the same level in the reproduction signals from the first and second read head elements 38, 39. The arithmetic logic circuit 44 derives the output difference of "zero" at the datum position A in the radial direction. Here, the centerline CH of the electromagnetic transducer 37 is aligned with the centerline CR of the first recording track 25a. As long as the output difference takes "zero", the electromagnetic transducer 37 is allowed to keep following the centerline CR of the first recording track 25a. The write element of the electromagnetic transducer 37 should write information in the first recording track 25a in this situation. Alternatively, the read element of the electromagnetic transducer 37 should read a string of bit data sequence out of the first recording track 25a.

Assume that the centerline CH of the electromagnetic transducer 37 shifts outward in the radial direction of the magnetic recording disk 14 by a predetermined offset amount s from the centerline CR of the recording track 25 due to vibration of the flying head slider 22, for example. In this case, the boundary P shifts toward the second recording track 25b in the radial direction by the offset amount s from the centerline CD of the separation track 26. The first read head element 38 thus moves from a space above the separation track 26 to a space above the second recording track 25b. The output level increases in the reproduction signal from the first read head element 38. At the same time, the second read head element 39 moves from a space above the first recording track 25a to a space above the separation track 26, so that the output level decreases in the reproduction signal from the second read head element 39. The arithmetic logic circuit 44 thus derives a positive value for the output difference 51. The arithmetic logic circuit 44 calculates the position of the boundary P in the radial direction, namely the offset amount s of the electromagnetic transducer 37, based on the derived output difference 51. The positional information is in this manner generated. The positional information is utilized to generate a control signal for supply to the voice coil motor 23.

The voice coil motor 23 drives the head actuator 16 around the support shaft 17 based on the magnitude of the control signal. The rotation of the actuator 16 causes the boundary P to move toward the centerline CD of the separation track 26. The boundary P is thus positioned right above the centerline CD of the separation track 26. At the same time, the centerline CH of the electromagnetic transducer 37 approaches the centerline CR of the first recording track 25a over the offset amount s. The centerline CH of the electromagnetic transducer 37 is thus positioned right above the centerline CR of the first recording track 25a. The electromagnetic transducer 37 is thus allowed to keep tracing the centerline CR of the first recording track 25a. Here, the write element of the electromagnetic transducer 37 should write information in the first recording track 25a. Alternatively, the read element of the electromagnetic transducer 37 should read a string of bit data sequence out of the first recording track 25a.

Next, assume that the centerline CH of the electromagnetic transducer 37 shifts inward in the radial direction of the magnetic recording disk 14 by a predetermined offset amount s from the centerline CR of the recording track 25 due to vibration of the flying head slider 22. In this case, the boundary P shifts toward the first recording track 25a in the radial direction by the offset amount s from the centerline CD of the separation track 26. The first read head element 38 thus moves from a space above the second recording track 25b to a space above the separation track 26. The output level decreases in the reproduction signal from the first read head element 38. At the same time, the second read head element 39 moves from a space above the separation track 26 to a space above the first recording track 25a, so that the output level increases in the reproduction signal from the second read head element 39. The arithmetic logic circuit 44 derives a negative value for the output difference 51. The arithmetic logic circuit 44 calculates the position of the boundary P in the radial direction, namely the offset amount s of the electromagnetic transducer 37, based on the derived output difference 51. The positional information is in this manner generated. The positional information is utilized to generate a control signal for supply to the voice coil motor 23.

The voice coil motor 23 drives the head actuator 16 around the support shaft 17 based on the magnitude of the control signal in the same manner as described above. The rotation of the actuator 16 causes the boundary P to move toward the centerline CD of the separation track 26. The boundary P is thus positioned right above the centerline CD of the separation track 26. At the same time, the centerline CH of the electromagnetic transducer 37 approaches the centerline CR of the first recording track 25a over the offset amount s. The centerline CH of the electromagnetic transducer 37 is thus positioned right above the centerline CR of the first recording track 25a. The electromagnetic transducer 37 is in this manner allowed to keep tracing the centerline CR of the first recording track 25a. Here, the write element of the electromagnetic transducer 37 should write information in the first recording track 25a. Alternatively, the read element of the electromagnetic transducer 37 should read a string of bit data sequence out of the first recording track 25a.

Since the north and south poles are randomly arranged in a string of bit data in the recording track 25, the maximum and minimum peaks are thus randomly appear in the reproduction signals from the first and second read head elements 38, 39. The output levels of the first and second read head elements 38, 39 change as time elapses. The normalized value, such as an average over a predetermined time period, may be utilized as the output levels of the first and second read head elements 38, 39, for example, at the arithmetic logic circuit 44. Specifically, the average over one round of the recording track 25 may be utilized as the output levels of the first and second read head elements 38, 39.

The hard disk drive 11 allows the first and second read head elements 38, 39 to generate reproduction signals based on the recording track 25 in detecting the output difference 51. The output levels of the first and second read head elements 38, 39 vary in accordance with the position of the first and second read head elements 38, 39 in the radial direction of the magnetic recording disk 14. Since the first and second read head elements 38, 39 are arranged side by side in the radial direction, the output difference 51 reliably changes. The variation in the output difference 51 serves to determine the position of the first and second read head elements 38, 39 in the radial direction, namely the offset amount s of the electromagnetic transducer 37. As long as the boundary P is positioned in accordance with the output difference taking "zero", the electromagnetic transducer 37 keeps tracking the centerline CR of the recording track 25. This enables establishment of the tracking servo control with a higher accuracy.

Moreover, the output difference 51 is calculated between the output levels of the first and second read head elements 38, 39 to realize the tracking servo control. The reproduction signal based on the string of bit data in the recording track 25 is utilized to detect the output difference 51. Establishment of so-called servo sectors can be omitted in the magnetic recording disk 14. The recording track 25 is thus allowed to extend over a larger area in the magnetic recording disk 14 as compared with a conventional magnetic recording disk. Area can be enlarged for recordation of bit data. The structure of the magnetic recording disk 14 can be simplified as compared with a conventional magnetic recording disk. A process of forming servo sectors can also be omitted in the production of the magnetic recording disk 14, so that the production time can greatly be shortened.

Here, assume that the recording track 25 has a lateral width L, while the separation track 26 has a lateral width W in the hard disk drive 11. The core width X of the first and second read head elements 38, 39 are defined as follows:

$$\frac{W}{2} + n \times (W + L) \le X \le \frac{W}{2} + L + n \times (W + L)$$

Here, variable n may be zero, for example. If the core width X falls below W/2, half the lateral width W, the first and second read head elements 38, 39 cannot receive a magnetic field from the first and second recording tracks 25a, 25b with the boundary P shifting from the centerline CD of the separation track 26. The output difference thus keeps taking "zero". If the core width X exceeds (W/2+L) to the contrary, the opposite ends of the first and second read head elements 38, 39 are all located on the separation track 26. The first and second read head elements 38, 39 keep facing the equal areas in the recording track 25 with the boundary P shifting from the centerline CD of the separation track 26. The output difference likewise keeps taking "zero".

As long as the variable n takes the natural number, the expression can be satisfied. As the variable n increases, the first and second read head elements 38, 39 face an increased number of recording tracks 25. The output level can be increased at the first and second read head elements 38, 39. Increment and decrement of the outputs are kept constant irrespective of the number of recording tracks 25. As the number of recording tracks 25 increases, the percentage of the increment or decrement should reduce in the entire outputs. Accordingly, the variable n preferably takes "zero".

Figure 8:
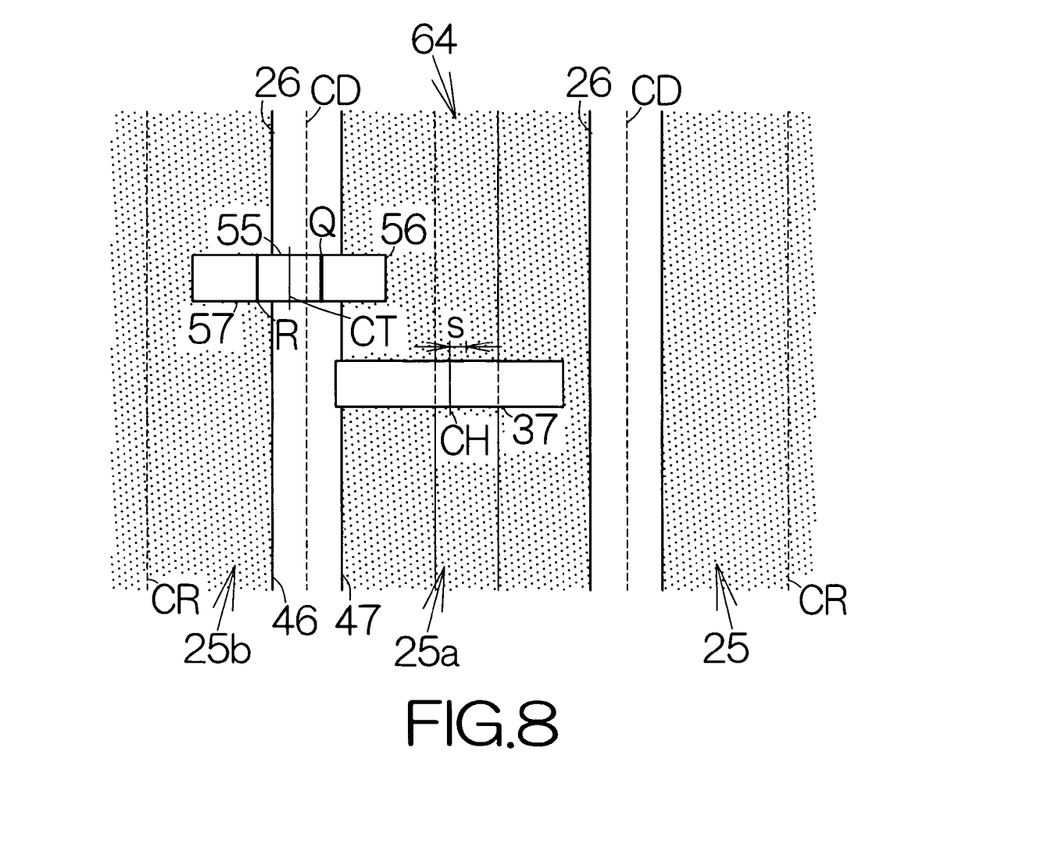
FIG. 8 is a schematic view illustrating the positional relationship between the electromagnetic transducer and first to third read head elements.

As shown in FIG. 8, first to third read head elements 55, 56, 57 may be utilized on the flying head slider 22 in place of the aforementioned first and second read head elements 38, 39, for example. The first to third read head elements 55, 56, 57 may be arranged one after another in the radial direction. The first read head element 55 may be interposed between the second and third read head elements 56, 57. Here, the distance between the centerline CT of the first read head element 55 and the centerline CH of the electromagnetic transducer 37 may be set equal to the distance between the centerline CR of the first recording track 25*a* and the centerline CD of the separation track 26. The first to third read signal circuits, not shown, similar to the aforementioned read signal circuits 42, 43, may be designed to receive the reproduction signals from the first to third read head elements 55, 56, 57 in the same manner as described above.

Figure 9:
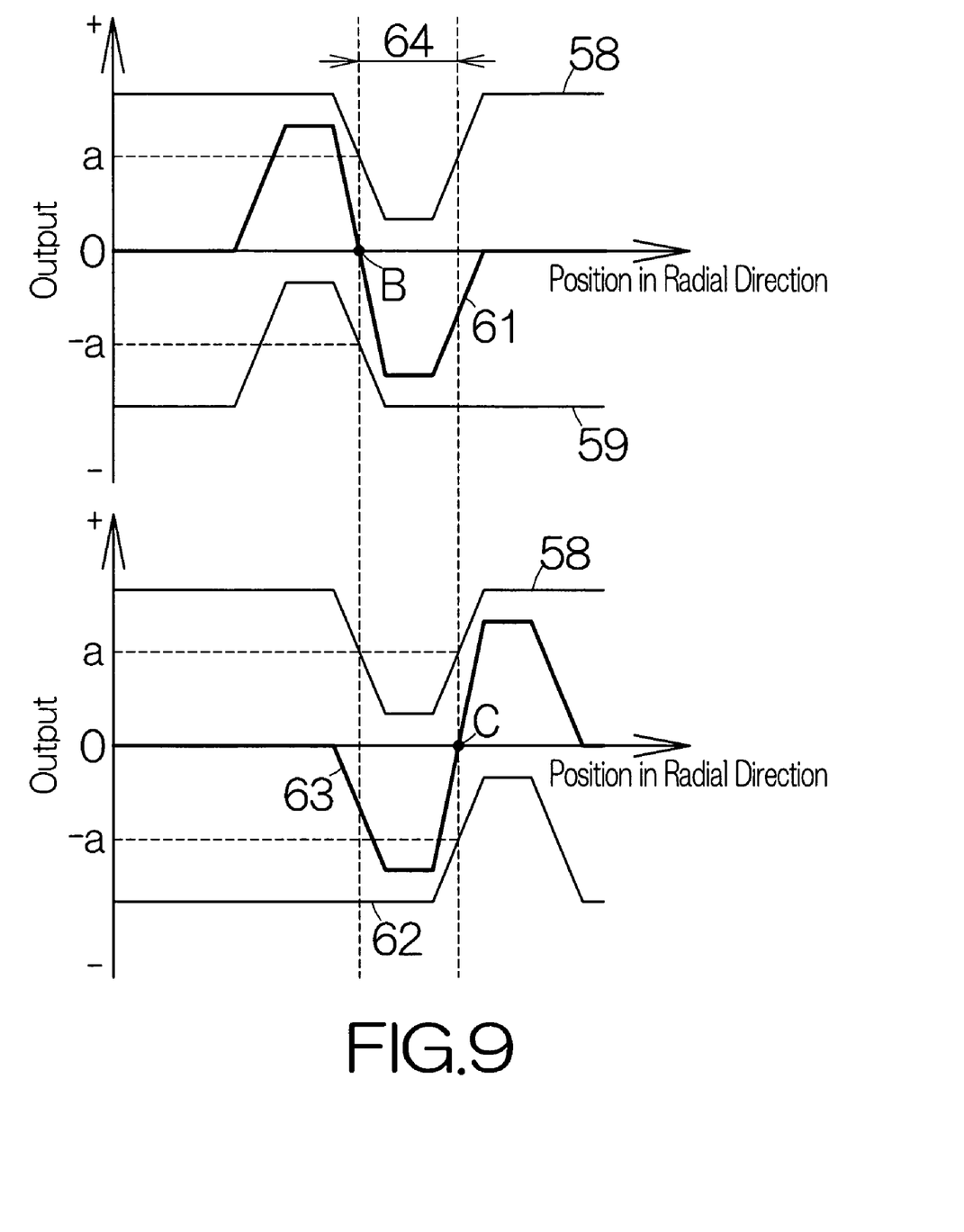
FIG. 9 is a graph illustrating the output profiles of the first to third read head elements.

Now, assume that the flying head slider 22 is to be positioned in the radial direction during the rotation of the magnetic recording disk 14. When the boundary Q between the first and second read head elements 55, 56 is aligned with the centerline CD of the separation track 26 during the rotation of the magnetic recording disk 14, for example, the arithmetic logic circuit 44 detects the equal output levels 58, 59 in the reproduction signals from the first and second read head elements 55, 56, as shown in FIG. 9. The arithmetic logic circuit 44 derives an output difference 61 taking "zero" at the datum position B in the radial direction. A predetermined offset amount s is established between the centerline CH of the electromagnetic transducer 37 and the centerline CR of the first recording track 25*a*. In this case, the electromagnetic transducer 37 is positioned within a permissible area for read/write operations over the first recording track 25*a*.

On the other hand, when the boundary R between the first and third read head elements 55, 57 is aligned with the centerline CD of the separation track 26 during the rotation of the magnetic recording disk 14, for example, the arithmetic logic circuit 44 detects the equal output levels 58, 62 in the reproduction signals from the first and third read head elements 55, 57, as shown in FIG. 9. The arithmetic logic circuit 44 derives an output difference 63 taking "zero" at the datum position C in the radial direction. A predetermined offset amount s is established between the centerline CH of the electromagnetic transducer 37 and the centerline CR of the first recording track 25*a*. In this case, the electromagnetic transducer 37 is positioned within a permissible area for read/write operations over the first recording track 25*a*.

The datum position B corresponding to "zero" in the output difference 61 and the datum position C corresponding to "zero" in the output difference 63 in cooperation serve to establish the permissible area 64 for read/write operations, as shown in FIG. 8, for example. The arithmetic logic circuit 44 is allowed to calculate the offset amount s for the electromagnetic transducer 37 based on the outputs from the first to third read head elements 55, 56, 57 and the output differences 61, 63. As long as the output differences 61, 63 are set in the permissible area 64, the electromagnetic transducer 37 is allowed to effect the read and/or write operations. The hard disk drive 11 of the type allows the electromagnetic transducer 37 to reliably stay within the permissible area 64 for read/write operations based on the outputs from the first to third read head elements 55, 56, 57. This enables establishment of the tracking servo control with a higher accuracy.

It should be noted that the magnetic recording disk 14 may be designed to be suitable for perpendicular magnetic recording. In this case, a soft magnetic underlayer may be interposed between the substrate 27 and the magnetic layer 28. The axis of easy magnetization is set in the magnetic layer 28 in the direction perpendicular to the flat surface 31.

Figure 10:
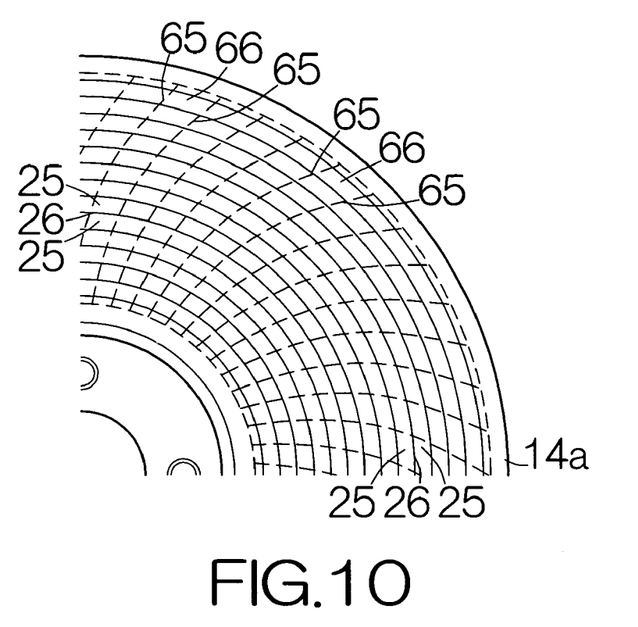
FIG. 10 is a partial plan view of a magnetic recording disk incorporated according to a second embodiment of the present invention.

FIG. 10 schematically illustrates the structure of the magnetic recording disk 14*a* according to a second embodiment of the present invention. Bent servo sectors 65 of sixty stripes, for example, are defined on the front and back surfaces of the magnetic recording disk 14*a* so as to extend in the radial direction of the magnetic recording disk 14*a*. The servo sectors 65 serve to fragment the recording tracks 25 and the separation tracks 26 in the circumferential direction. The servo sectors 65 are made of a magnetic material. Servo patterns are respectively established within the servo sectors 65. The shape of the servo sector 65 depends upon the movement path of the electromagnetic transducer 37. A data sector 66 is defined between the adjacent servo sectors 65. Magnetic information is held in the recording tracks 25 within the data sectors 66. Like reference numerals are attached to components or structure equivalent to those of the aforementioned first embodiment.

The electromagnetic transducer 37 is allowed to follow the recording track during the rotation of the magnetic recording disk 14*a* based on tracking servo control. The read element of the electromagnetic transducer 37 is utilized to read the position signals out of the servo patterns defined on the magnetic recording disk 14*a* in the tracking servo control. The amplified position signals are supplied to the hard disk controller. The hard disk controller determines the control quantity of the voice coil motor 23 based on the supplied position signals. The voice coil motor 23 thus receives a driving current corresponding to the control signals output from the hard disk controller. The position signals are utilized to cancel the offset of the electromagnetic transducer 37. The electromagnetic transducer 37 is thus positioned in the radial direction of the magnetic recording disk 14*a*. The electromagnetic transducer 37 is in this manner allowed to keep tracking the recording track 25. The write element of the electromagnetic transducer 37 should write information along the recording track 25 within the data sectors 66 in this situation. Alternatively, the read element of the electromagnetic transducer 37 should read a string of bit data sequence out of the recording track 25 within the data sectors 66.

Figure 11:
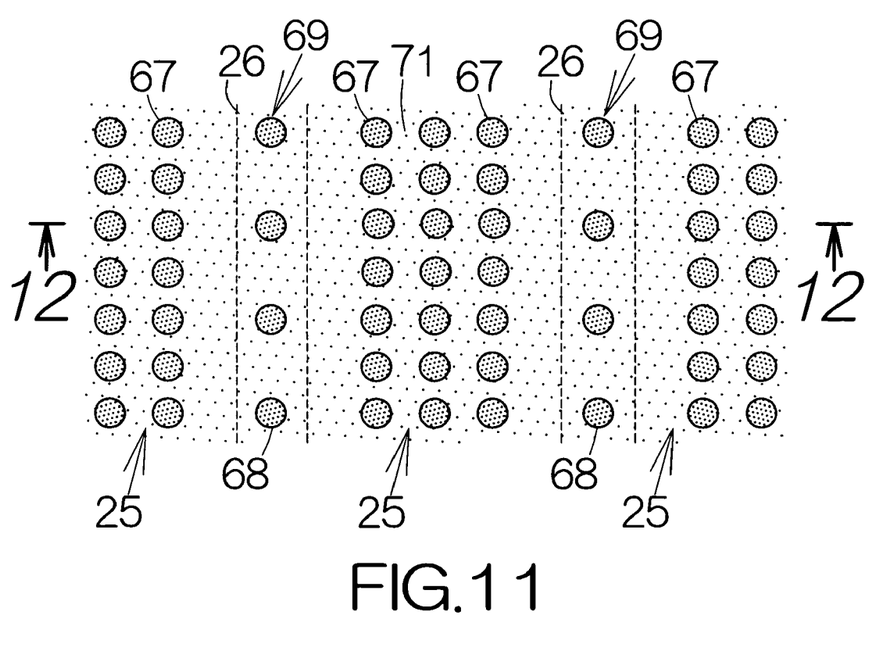
FIG. 11 is an enlarged partial plan view of the magnetic recording disk.

As shown in FIG. 11, the recording track 25 includes recording or magnetic cells 67, 67, . . . , arranged in a matrix in the magnetic recording disk 14*a*. The magnetic cells 67 may equally be spaced one another, for example. The separation track 26 likewise includes recording or magnetic cells 68, 68, . . . . The magnetic cells 68 are equally distanced one another, for example. The magnetic cells 68 form a cell string 69. The cell string 69 extends in the separation track 26 in the circumferential direction of the magnetic recording disk 14*a*. The magnetic cells 67 are arranged in the circumferential direction based on the arrangement of the magnetic cells 68 in the circumferential direction. The individual magnetic cell 68 may be allocated to every two or more of the magnetic cells 67. Here, the individual magnetic cell 68 is aligned with every two of the magnetic cells 67. A non-magnetic body 71 is utilized to isolate the magnetic cells 67, 68.

Figure 12:
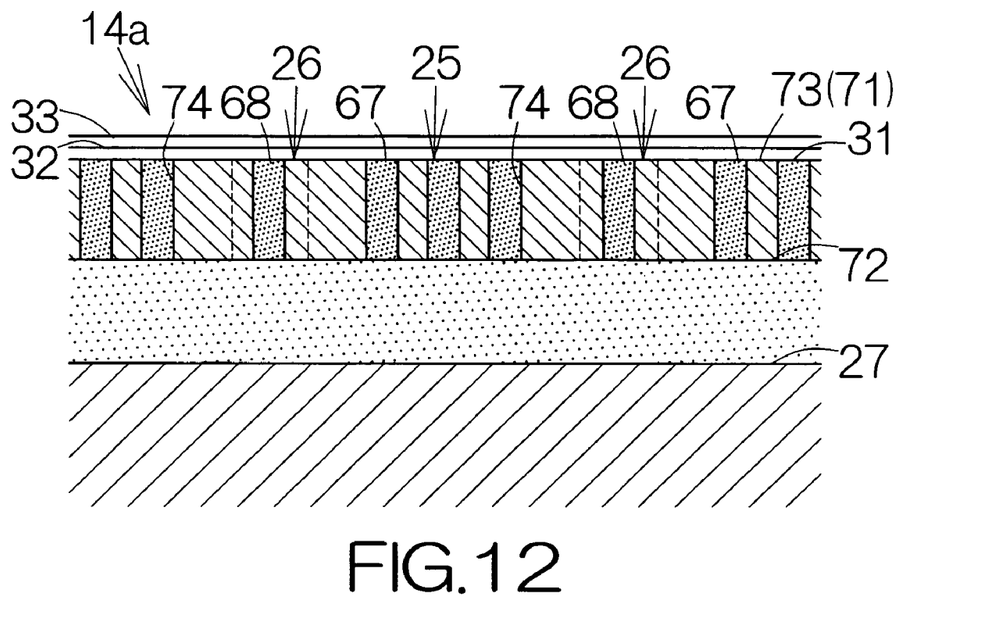
FIG. 12 is an enlarged partial sectional view taken along the line 12-12 in FIG. 11.

As is apparent from FIG. 12, the magnetic recording disk 14*a* includes a soft magnetic underlayer 72 extending over the surface of the substrate 27. A non-magnetic film 73 is overlaid on the surface of the soft magnetic underlayer 72.

The non-magnetic film 73 forms the non-magnetic body 71. Nanoholes 74, 74, . . . , are formed in the non-magnetic film 73. The nanoholes 74 are filled with a magnetic material so as to establish the magnetic cells 67, 68. A flat surface 31 are defined over the surfaces of the recording tracks 25 and the separation tracks 26 in the same manner as described above. The flat surface 31 may be covered with a protection layer 32, a lubricating film 33, and the like. The magnetic recording disk 14a of the type is suitable for perpendicular magnetic recording. The axis of easy magnetization is set in the magnetic cells 67, 68 in the direction perpendicular to the flat surface 31. Here, the polarity of the magnetic cells 68 may be either the south or north pole. It should be noted that the soft magnetic underlayer 72 may be omitted from the magnetic recording disk 14a.

Figure 13:
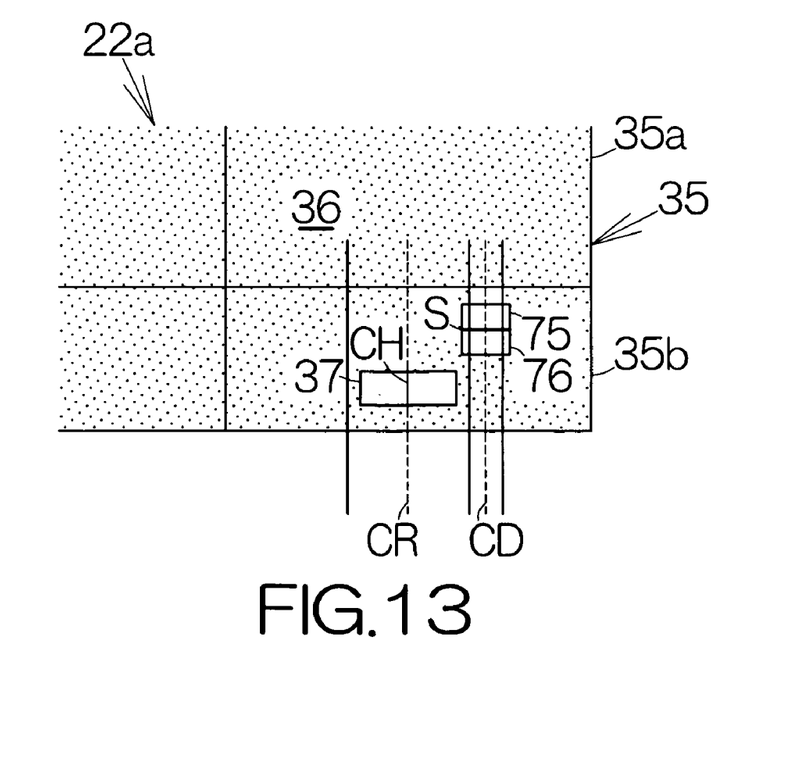
FIG. 13 is an enlarged partial plan view illustrating a part of the bottom surface of a flying head slider according to another specific example.

As shown in FIG. 13, the flying head slider 22a includes first and second read head elements 75, 76 mounted on the slider body 35. The first and second read head elements 75, 76 may be a magnetoresistive (MR) read element such as a GMR or TMR element in the same manner as described above. The first and second read head elements 75, 76 are arranged side by side in the longitudinal direction of the recording track 25. The boundary S thus extends between the first and second read head elements 75, 76 in the radial direction. The distance between the centerline of the first and second read head elements 75, 76 and the centerline CH of the electromagnetic transducer 37 may be set equal to the distance between the centerline CR of the recording track 25 and the centerline CD of the separation track 26. The core width of the first read head element 75 may be set equal to that of the second read head element 76.

Figure 14:
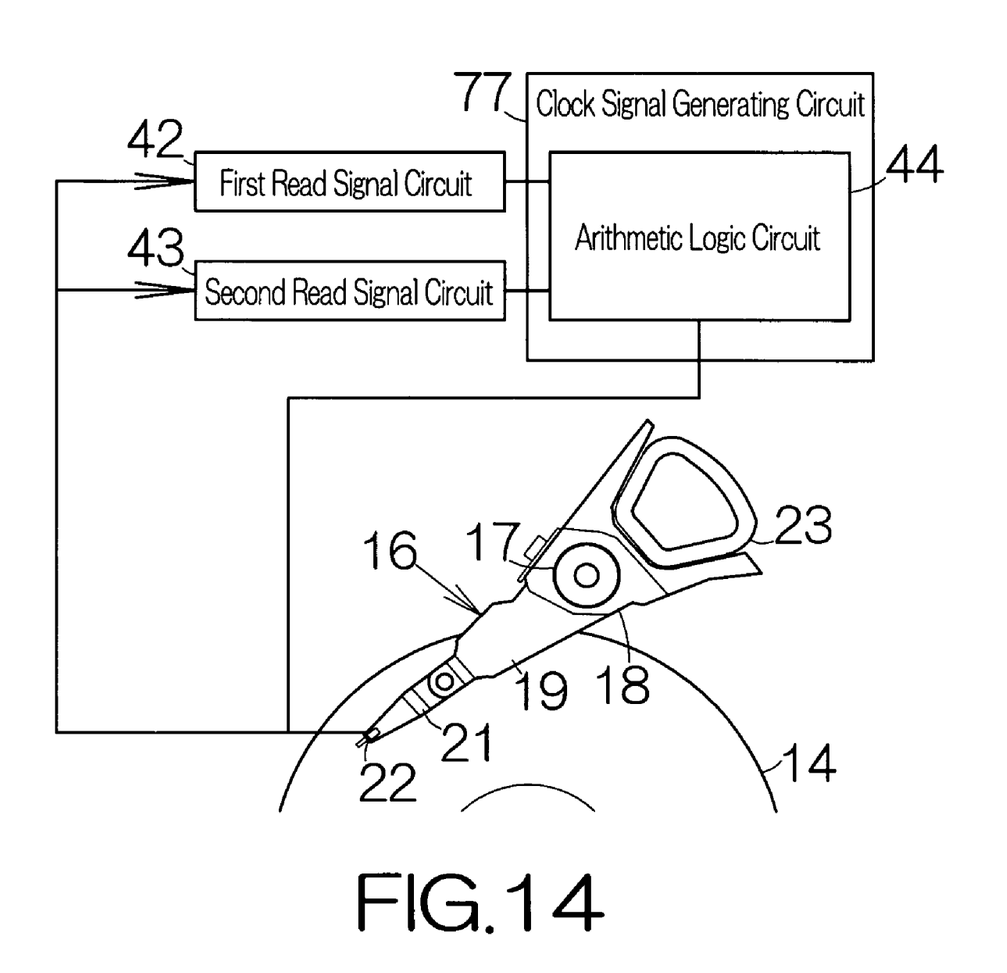
FIG. 14 is a block diagram schematically illustrating a clock signal generating circuit.

As shown in FIG. 14, a clock signal generating circuit 77 is incorporated in the hard disk drive 11. The clock signal generating circuit 77 is designed to generate a clock signal based on the reproduction signals supplied from the first and second read head elements 75, 76. The clock signal may be utilized to determine the timings of the read or write operation. The arithmetic logic circuit 44 detects the difference between the reproduction signal from the first read signal circuit 42 and the reproduction signal from the second read signal circuit 43. The detected difference is utilized to generate a clock signal applied to the electromagnetic transducer 37. The clock signal specifies the timing of the read operation or write operation at the electromagnetic transducer 37.

Figure 15:
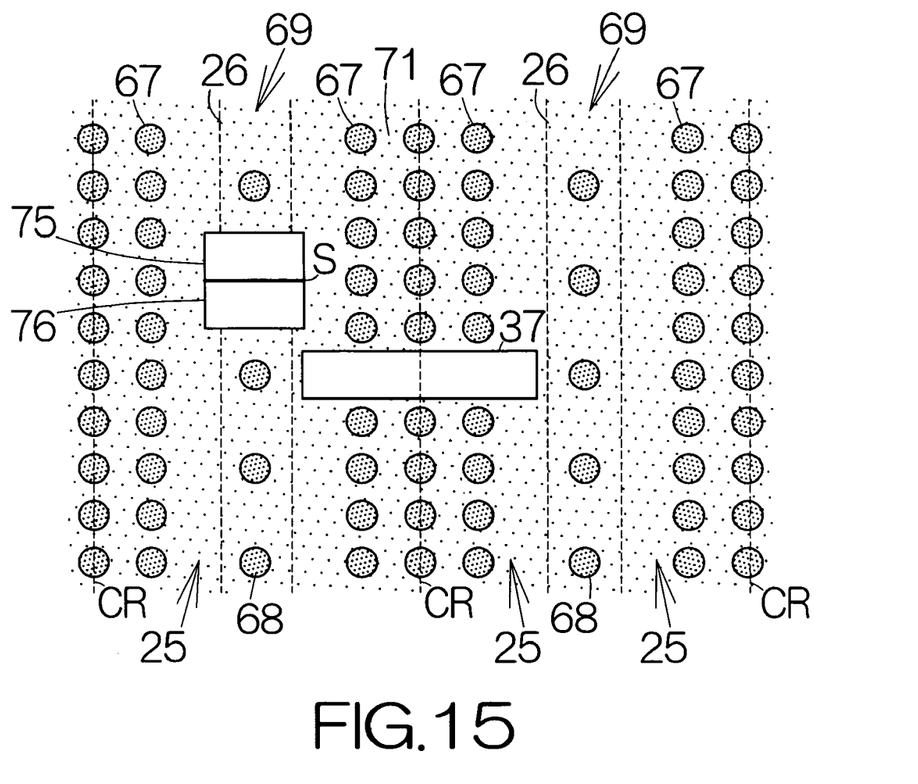
FIG. 15 is a schematic view illustrating the positional relationship between the electromagnetic transducer and first and second read head elements.

Now, assume that the flying head slider 22a is to be positioned in the radial direction during the rotation of the magnetic recording disk 14a. As shown in FIG. 15, the first and second read head elements 75, 76 fly above the separation track 26 during the rotation of the magnetic recording disk 14a. The rotation of the magnetic recording disk 14a causes the first and second read head elements 75, 76 to sequentially passes above the magnetic cells 68 in the direction of the cell string 69. The clock signal generating circuit 77 calculates the timing of the read or write operation of the electromagnetic transducer 37 based on the difference between the output levels of the first and second read head elements 75, 76.

Figure 16:
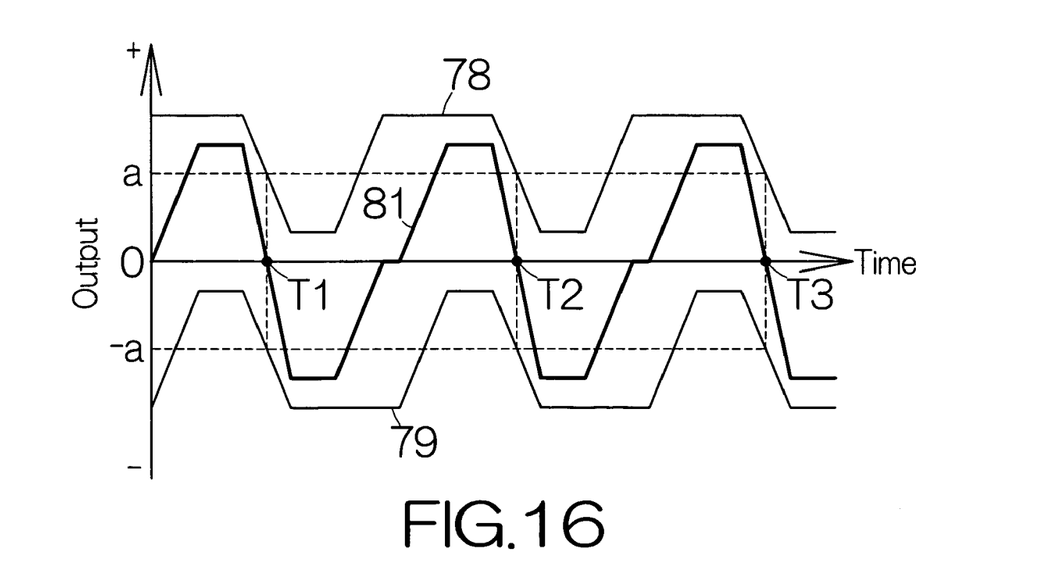
FIG. 16 is a graph schematically illustrating the output profiles of the first and second read head elements.

FIG. 16 illustrates the difference between the output levels of the first and second read head elements 75, 76 detected at the arithmetic logic circuit 44. The arithmetic logic circuit 44 detects the reproduction signal of the first read head element 75 as an output 78. The arithmetic logic circuit 44 likewise detects the reproduction signal of the second read head element 76 as an output 79. The arithmetic logic circuit 44 calculates an output difference 81 between the levels of the outputs 78, 79. The output difference 81 corresponds to the difference between the outputs 78, 79. The calculated output difference 81 varies as time elapses.

When the rotation of the magnetic recording disk 14a causes the first and second read head elements 75, 76 to move along the separation track 26 in the circumferential direction, the first read head element 75 first passes through a space above the magnetic cell 68. The output level of the first read head element 75 accordingly changes from the minimum value to the maximum value. The output level then falls from the maximum value to the minimum value. The second read head element 76 subsequently passes through the space above the magnetic cell 68. The output of the second read head element 76 follows the same profile as the first read head element 75 later by a predetermined time lag. The arithmetic logic circuit 44 thus detects the output difference 81 based on the outputs. The output difference 81 is utilized to calculate the position of the boundary S in the circumferential direction, namely the timing of the read or write operation of the electromagnetic transducer 37.

Here, when the boundary S passes right above the center of the magnetic cell 68, the arithmetic logic circuit 44 detects the output of the equal level for the reproduction signals of the first and second read head elements 75, 76. The arithmetic logic circuit 44 derives the output difference of "zero" at the time points T1, T2, T3, as shown in FIG. 16. The timings of the read or write operation of the electromagnetic transducer 37 is aligned with the time points of "zero". The clock signal generating circuit 77 generates clock signals at the time points T1, T2, T3, . . . . The generated clock signals are supplied to the electromagnetic transducer 37. The timings of the read or write operation can thus be controlled in the electromagnetic transducer 37. The write element of the electromagnetic transducer 37 should write information into the recording track 25a in response to the clock signals. The read element of the electromagnetic transducer 37 should likewise read a string of bit data out of the recording track 25a in response to the clock signals.

The hard disk drive 11a enables detection of the output difference between the output levels in the reproduction signals of the first and second read head elements 75, 76. The first and second read head elements 75, 76 are allowed to sequentially passes above the magnetic cells 68 spaced at equal intervals in the separation track 26. The movement induces variation in the output levels of the first and second read head elements 75, 76 as time elapses. Moreover, the time lag is established between the outputs of the first and second read head elements 75, 76. The output difference thus changes. The change in the output difference can be utilized to generate a clock signal applied to the electromagnetic transducer 37. The read or write operation of the electromagnetic transducer 37 is controlled in accordance with the timings corresponding to the generated clock signals. The timings of the read or write operation is reliably aligned with the clock signals with a higher accuracy.

Figure 17:
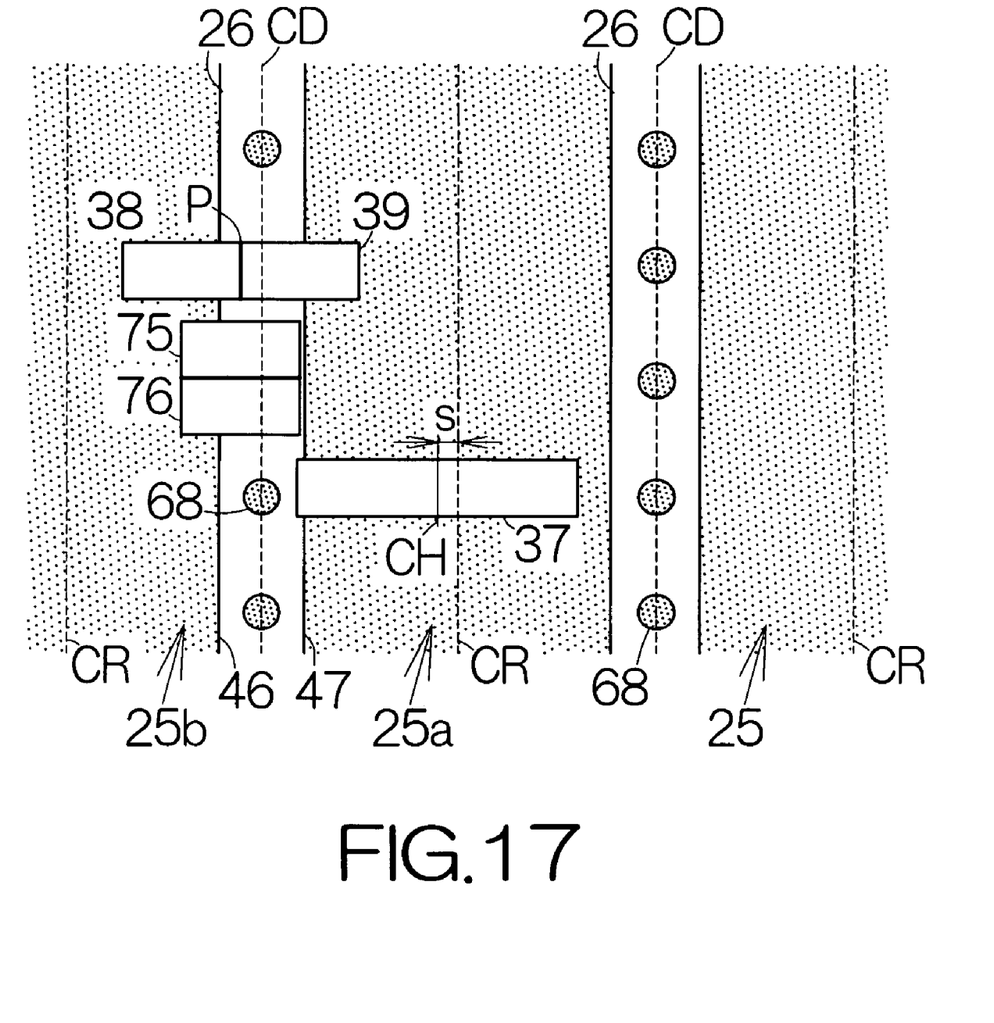
FIG. 17 is a schematic view illustrating the positional relationship between the first and second read head elements and magnetic cells.

As shown in FIG. 17, the first and second read head elements 75, 76 may also be mounted on the aforementioned flying head slider 22. The boundary P between the first and second read head elements 38, 39 may be aligned with the centerline of the first and second read head elements 75, 76 in the lateral direction of the recording track 25. The magnetic recording disk 14 may be designed to be suitable to perpendicular magnetic recording, for example. The recording tracks 25 may include a magnetic layer and a soft magnetic underlayer. The magnetic cells 68 are arranged in the separation track 26 at equal intervals.

The output levels of the first and second read head elements 38, 39 may be determined based on the recording tracks 25 and the magnetic cells 68 in the calculation of the output difference for the first and second read head elements 38, 39. The electromagnetic transducer 37 is allowed to keep following the centerline CR of the recording track 25 based on the output difference for the first and second read head elements 38, 39. This enables establishment of the tracking servo control with a higher accuracy. At the same time, a clock signal is generated for the electromagnetic transducer 37 based on the output from the first and second read head elements 75, 76. The timings of the read or write operation of the electromagnetic transducer 37 is reliably aligned with the clock signals with a higher accuracy.

What is claimed is:

1. A method of detecting position of a head in a recording medium drive, comprising:
    detecting a difference between outputs from first and second heads different from the head, said first head positioned on a boundary between a first recording track and a separation track isolating the first recording track and a second recording track from each other, said second head positioned on a boundary between the separation track and the second recording track; and
    generating a position information specifying the position of the head relative to the first recording track based on the difference.

2. The method according to claim 1, wherein core width X of the first and second heads are defined as $$\frac{W}{2} + n \times (W + L) \le X \le \frac{W}{2} + L + n \times (W + L)$$

where $n \ge 0 (n = \text{integer})$ where L denotes width of the first and second recording tracks, and W denotes width of the separation track.

3. A recording medium drive comprising:
    a recording medium defining a separation track isolating adjacent first and second recording tracks;
    a first head opposed to a boundary between the separation track and the first recording track;
    a second head opposed to a boundary between the separation track and the second recording track;
    a head designed to follow the first recording track, said head different from the first and second heads;
    a drive mechanism supporting the first and second heads and the head said drive mechanism designed to drive the first and second heads and the head in a lateral direction of the first and second recording tracks; and
    a controller circuit designed to control operation of the drive mechanism according to a difference between outputs supplied from the first and second heads based on the first and second recording tracks.

4. A method of generating a clock signal for a recording medium drive, comprising:
    sequentially moving first and second heads along a row of recording cells equally spaced one another in a separation track isolating adjacent recording tracks;
    detecting a difference of outputs from the first and second heads based on the recording cells; and
    generating the clock signal based on the difference.

5. A recording medium drive comprising:
    a recording medium defining a row of recording cells equally spaced one another in a separation track isolating adjacent recording tracks;
    first and second heads opposed to the recording cells;
    a read/write head designed to effect read/write operations for the recording track; and
    a clock signal generating circuit designed to generate a clock signal based on a difference between outputs from the first and second heads, said clock signal specifying a timing of the read/write operations of the read/write head.

* * * * *